Inventors
R. J. Dixon
L. Jones
J. S. Riley
By Glascock Downing Diebold
Attys.

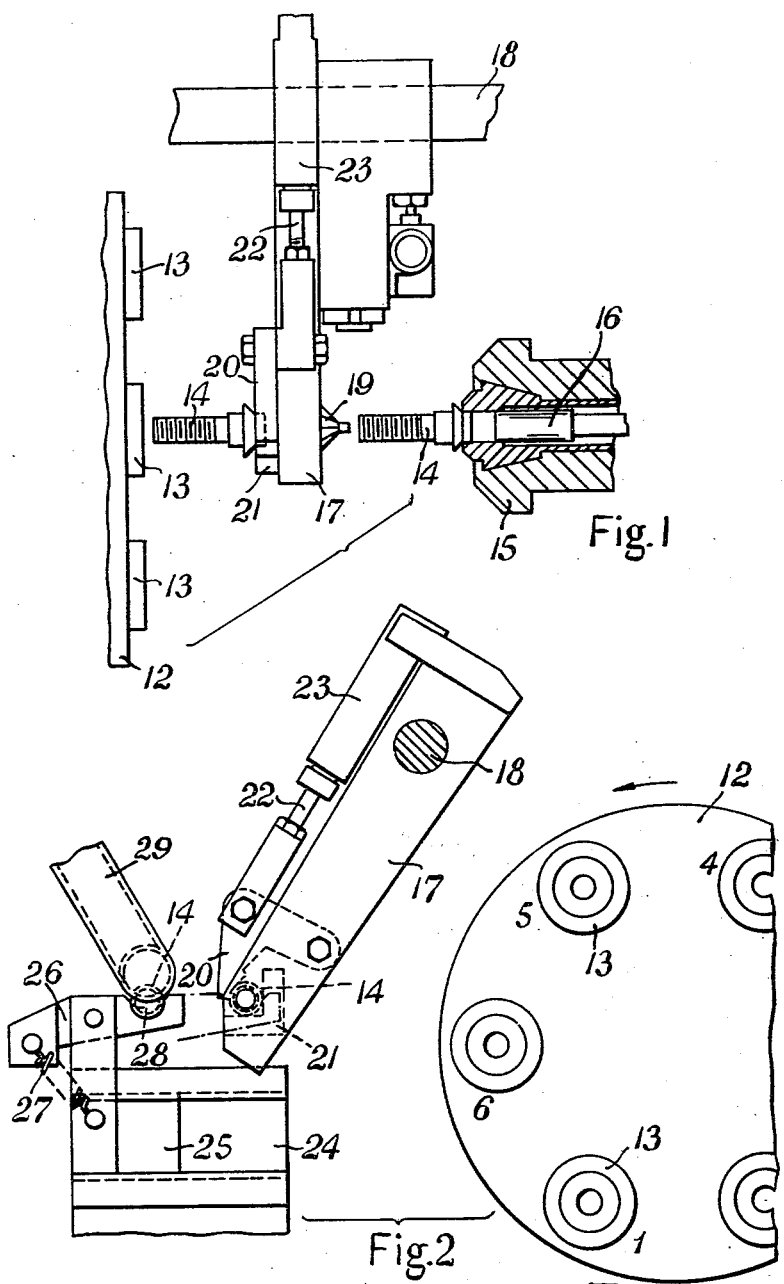

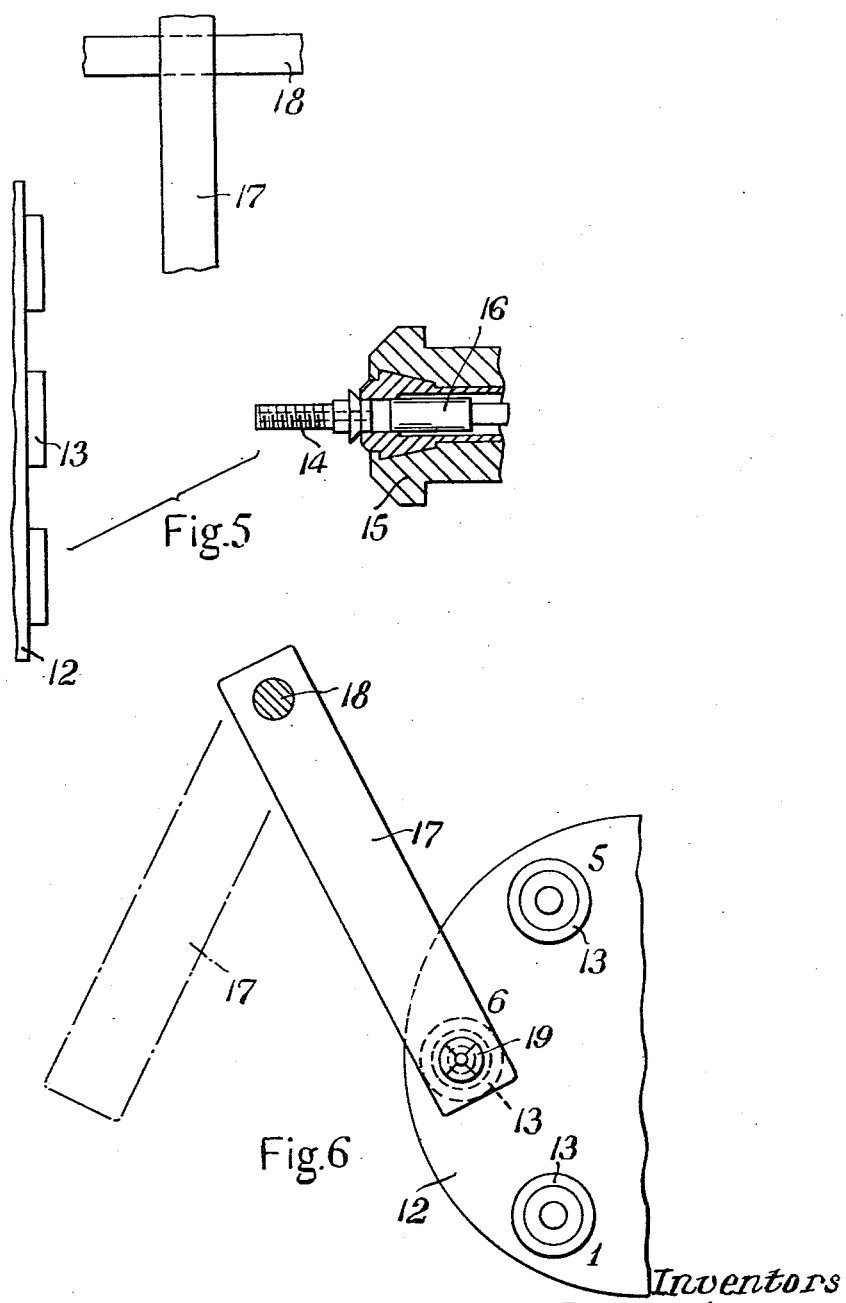

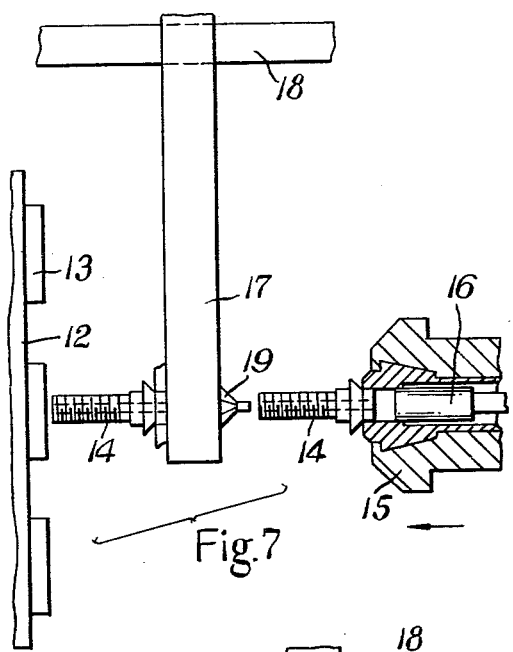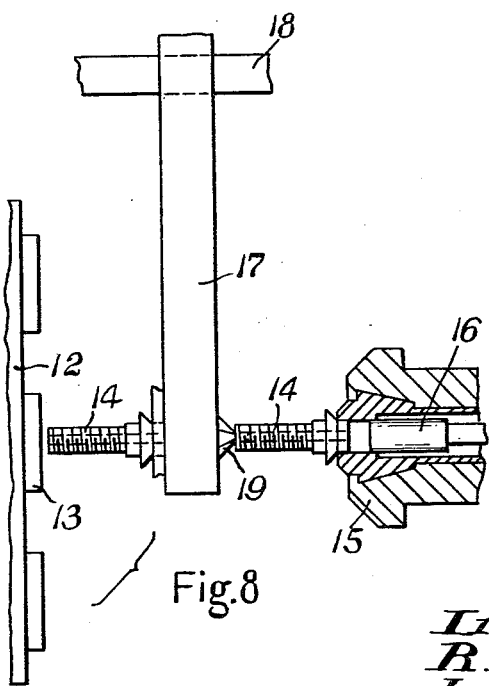

July 10, 1962  R. J. DIXON ET AL  3,043,166
LATHES

Filed Oct. 16, 1959                                      6 Sheets-Sheet 5

Inventors
R. J. Dixon
L. Jones
J. S. Riley
By Glascock Downing Seebold
Attys.

United States Patent Office 3,043,166
Patented July 10, 1962

3,043,166
LATHES
Reginald John Dixon, Solihull, Lewis Jones, Coventry, and James Sidney Riley, Earlsdon, Coventry, England, assignors to Wickman Limited, Coventry, England
Filed Oct. 16, 1959, Ser. No. 846,854
Claims priority, application Great Britain Oct. 23, 1958
5 Claims. (Cl. 77—5)

This invention relates to a mechanism for use in a lathe adapted to perform operations on similar work-pieces which are successively fed to the lathe.

A mechanism in accordance with the invention includes a principal rotary work holder, a secondary rotary and slidable work holder arranged to extract a work-piece from the principal work holder, and an angularly and laterally movable arm adapted to transfer successive work-pieces from a feed position to the principal work holder and to carry a tool for performing an operation on a work-piece held by the secondary work holder.

In the accompanying drawings:

FIGURES 1 and 2 are respectively a front elevation and an end elevation illustrating diagrammatically a mechanism embodying the invention.

FIGURES 3 to 10 are diagrammatic views illustrating successive stages in each cycle of actions performed by the said mechanism.

Figure 3:
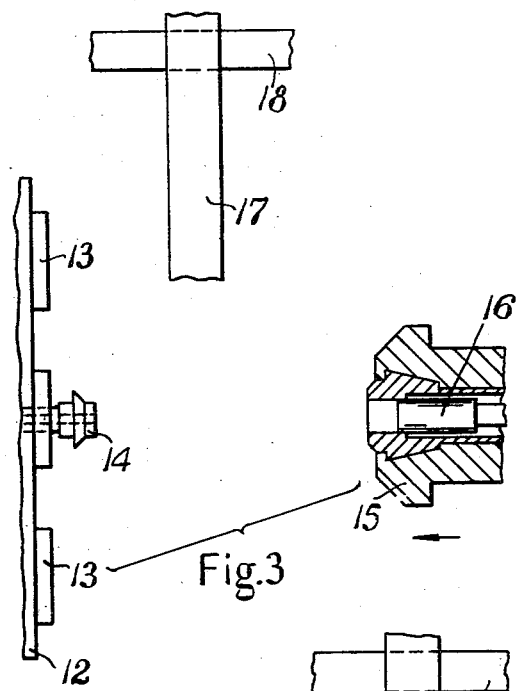

In the application of the invention in the manner illustrated by the drawings to a lathe of the kind comprising an intermittently rotatable drum 12 carrying a plurality of equi-spaced principal rotary work holders 13, whereby a work-piece as 14 is carried through a series of positions in which successive operations are performed on it, there is provided in line with the principal work holder to which the successive work-pieces are fed, a secondary rotary work holder 15 which is slidable towards and away from the said principal work holder, and which includes an ejector 16.

Also there is provided an arm 17 to which both angular and lateral movements can be imparted, this arm being secured at one end to a shaft 18 which is parallel to the axes of the work holders. On one side of the arm and adjacent to its free end provision is made for attachment thereto of a tool 19 for performing an operation on a work-piece carried by the secondary work holder 15. On the other side of the arm is provided a work gripper consisting of a jaw 20 which is pivoted on the arm and is arranged to co-operate with a fixed jaw 21. The jaw 20 is connected to and actuated by the outer end of a piston rod 22 extending from a cylinder 23 mounted on the arm, the motive fluid for actuating the piston being preferably compressed air.

For feeding successive work-pieces to the gripper on the arm there is mounted on the lathe a fixed guide 24 which carries a slide 25, and on the slide is pivoted a cradle 26 which is loaded by a spring 27, one end of the cradle having formed therein a V-notch 28 to which the successive work-pieces are fed along a tube 29.

Any convenient means familiar to those conversant with the art to which the invention relates are employed for effecting the required co-ordinated movements of the various parts above described.

In the particular example illustrated by the drawings, the intermittently rotatable drum 12 is provided with six equi-spaced principal rotary work holders 13, and the successive positions at which operations are performed on the work-pieces are indicated by the numerals 1, 2, 3, 4, 5, and 6 in FIGURE 2.

Figure 4:
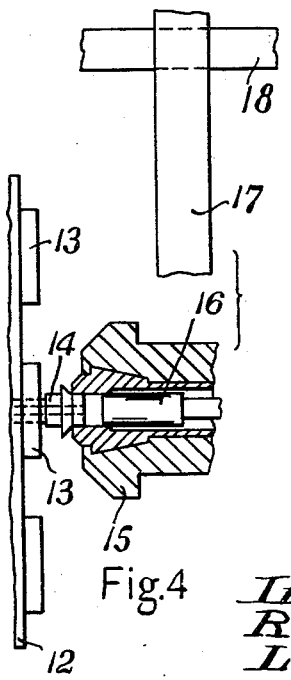
Figure 9:
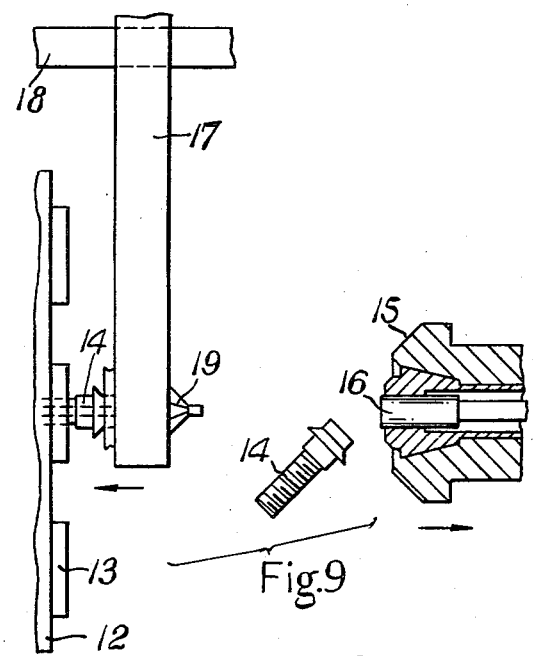
Figure 10:
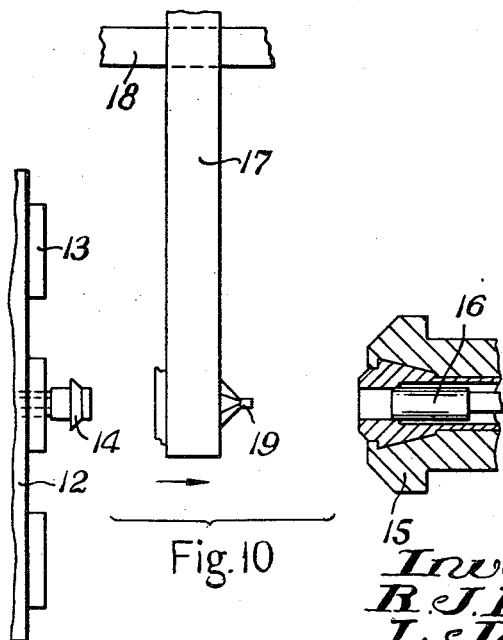

The mode of action is as follows:

Assuming that a work-piece has already been carried through the above mentioned positions by the rotary drum 12 and has arrived at the position 6, at which it is to be removed and replaced by the next work-piece, and that the arm 17 has already been moved to the position shown in FIGURE 2, the secondary work holder 15 is at this stage moved from the position shown in FIGURE 3 to that shown in FIGURE 4. In this latter position the work-piece is gripped by the secondary work holder and withdrawn to the position shown in FIGURE 5. Meanwhile the feed slide 25 carrying the next work-piece is advanced to the position shown by dotted lines in FIGURE 2, so causing this work piece to be placed between the jaws 20, 21. The piston rod 22 is then actuated for causing the jaws to grip the work-piece, and this having been done the arm is moved from the position shown in FIGURE 2 to the posiiton shown in FIGURES 6 and 7. At this stage the secondary work holder 15 is advanced for the performance on the work-piece carried thereby of an operation by the tool 19 as shown in FIGURE 8. In the subsequent retraction of the work holder 15 to the position shown in FIGURE 9, the ejector 16 discharges the work-piece, and meanwhile the arm 17 is moved for placing the attached work-piece 14 in the rotary work holder 13 of the drum 12 awaiting it at position 6 as shown in FIGURE 9. Later the arm is returned to the position shown in FIGURE 10, and while the work-piece is being carried through the other positions 1–5 at which other operations are performed on the work-piece the arm 17 is moved to the position 6 shown at FIGURE 2 for receiving the next work-piece prior to repetition of the cycle above described.

Figure 11:
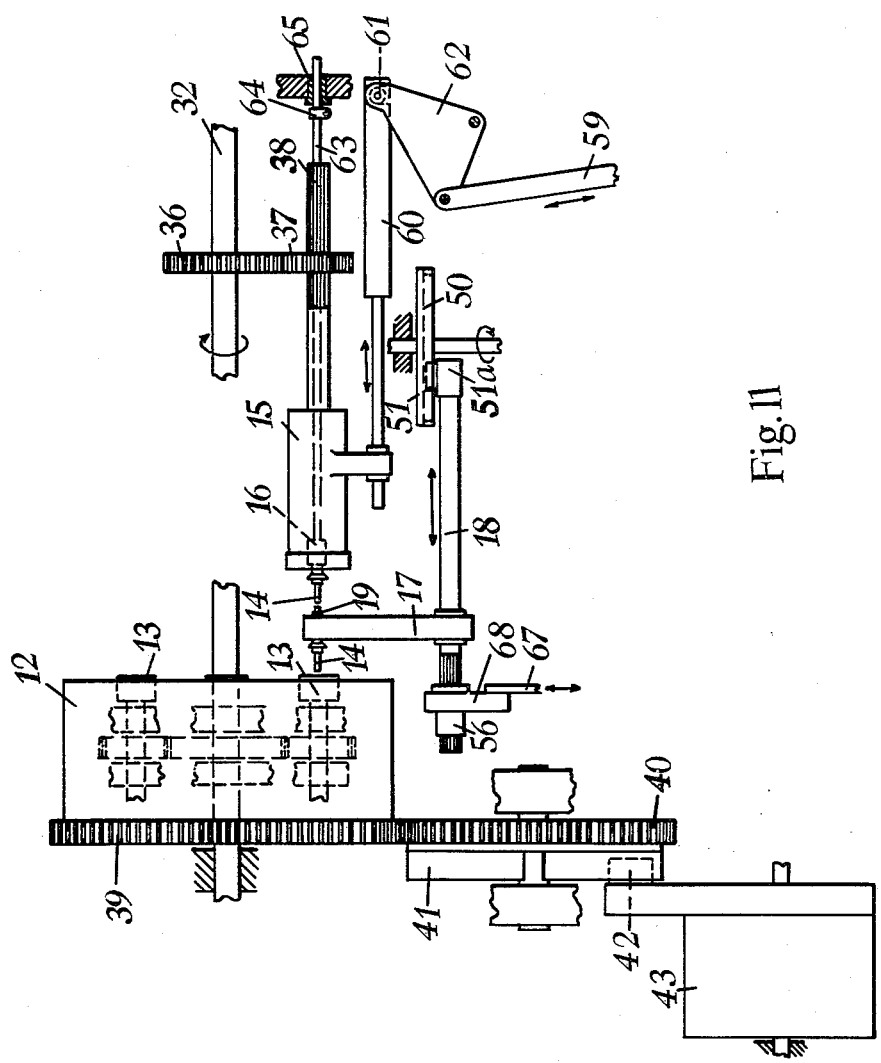
FIG. 11 is an exploded side view in diagrammatic form of the machine showing the elements of FIG. 1 arranged in operative relation incorporating conventional mechanisms for operating them.

A convenient mode of effecting the respective movements of the various parts above described is illustrated diagrammatically in FIG. 11.

Referring to FIG. 11, a hollow driving spindle 38 forming a rotatable part of the secondary rotary work holder 15, upon which the latter is mounted for sliding movement, has a splined connection with the gear wheel 37 to permit axial movement of this spindle. The gear wheel 37 is driven by a gear 36 mounted on a main drive shaft 32. A movable rod 60 which is arranged parallel with the driving spindle 38 of the secondary rotary work holder and secured to the latter, provides the required sliding movement of the latter by longitudinal movement of a link 59. The link is pivoted to one end of a bell-crank lever 62 which is pivoted at 61 to the rod 60.

Slidably supported within the hollow driving spindle 38 of the secondary rotary work holder 15 is a coaxial rod 63 on one end of which is formed or secured the ejector 16. The opposite end portion of the rod 63 extends from the corresponding end of the spindle 38, and has secured thereto a stop piece 64 which serves by contact with the adjacent end of a fixed bush 65 to arrest the rod during retraction of the secondary work holder 15 after the work piece 14 carried thereby has been in contact with the tool 19 on the arm 17. Consequently, further retraction of the secondary work holder 15 causes the work piece carried thereby to be discharged therefrom by the ejector 16.

For convenience and clarity of illustration the shaft 18 is shown in FIGURE 11 at a lower level than the intermittently rotatably drum 12 carrying the principal rotary work holders 13, but in practice this shaft is situated at a higher level.

The drum 12 carrying the principal work holders 13 is intermittently rotatable through interengaging gear wheels 39 and 40 by a Geneva mechanism 41 which is actuated through the medium of a roller 42 carried by a drum 43.

A rotary cam 50 serves by engagement with a roller 51 on the shaft 18, which carries the angularly and laterally movable arm 17, to impart axial movement to the last-mentioned shaft, the roller being mounted on this shaft through the medium of a sleeve 51a relative to which the shaft is rotatable. An internally splined sleeve 56 is mounted on and engages a complementary splined portion of the shaft 18 so that the required angular movement of arm 17 secured to said shaft is effected by angular movement of the latter under the action of the link 67. This latter link is pivoted to a link 68 which in turn is pivoted to sleeve 56 such that movement of the link 67 in the directions indicated by the arrows causes angular movements of arm 17.

Whilst the mechanism in accordance with the invention is primarily required for use in a lathe of the kind in which a rotary drum is employed as above described for carrying a plurality of principal work holders, it is applicable in a like manner to a lathe in which a single principal work holder is employed in conjunction with a co-linear secondary work holder.

Having thus described our invention what we claim as new and desire to secure by Letters Patent is:

1. A mechanism for use in a lathe of the kind specified comprising in combination, a principal work holder, means supporting the holder for angular movement about an axis spaced from the holder, a secondary work holder mounted for rotation about a second axis and shiftable along the second axis, means for intermittently moving the primary work holder to a position spaced from and confronting the secondary work holder, means for moving the secondary work holder axially to extract a work-piece from the primary work holder when the latter is in said confronting relation and for rotating the secondary work holder and work-piece, a transfer arm having blank receiving means and a tool and mounted for swinging movement intermediate the confronting work holders in a plane transverse to the second axis and for shifting movement parallel to the second axis, means for swinging the arm from a first position radially of the second axis at which the arm receives a blank to a second position intermediate the confronting primary and secondary work holders, and means for shifting the arm in one direction while in the second position to insert the blank in the primary work holder and in the opposite direction for applying the tool to the work-piece extracted by the secondary work holder.

2. A mechanism according to claim 1 and having means for feeding a work-piece to the transfer arm when the latter occupies the feed position, which means comprise in combination a fixed guide, a slide carried by and movable in opposite directions relative to the guide, and a spring-loaded cradle which is pivotally mounted on the slide, and through the medium of which a work-piece is fed to the transfer arm in response to movement of the slide in one direction.

3. A mechanism according to claim 1 and having mounted on the transfer arm a work-piece gripper comprising fixed and movable jaws, and fluid-operable means connected to the gripper for effecting actuation thereof.

4. A mechanism according to claim 1 and having a workpiece ejector mounted within the secondary work holder.

5. A mechanism for use in a lathe of the kind specified, comprising in combination, a rotatable drum supporting a plurality of principal work holders in arcuately spaced relation thereon, a secondary work holder mounted for rotation about an axis and shiftable along said axis, means for intermittently moving the drum to position a principal work holder in confronting spaced relation to the secondary work holder, means for moving the secondary work holder axially to extract a work-piece from a primary work holder when the latter is in said confronting relation and for rotating the secondary work holder and work-piece, a transfer arm having blank receiving means and a tool and mounted for swinging movement intermediate the confronting work holders in a plane transverse to the axis and for shifting movement parallel to the axis, means for swinging the arm from a first position radially of the axis at which the arm receives a blank to a second position intermediate the confronting primary and secondary work holders, and means for shifting the arm in one direction while in the second position to insert the blank in the primary work holder and in the opposite direction for applying the tool to the work-piece extracted by the secondary work holder.

No references cited.